(12) United States Patent
Daigo et al.

(10) Patent No.: US 8,670,258 B2
(45) Date of Patent: Mar. 11, 2014

(54) POWER SUPPLY DEVICE

(75) Inventors: Toru Daigo, Tokyo (JP); Nobuhiro Kihara, Tokyo (JP); Naoki Itoi, Tokyo (JP); Mitsuo Sone, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 217 days.

(21) Appl. No.: 13/349,281

(22) Filed: Jan. 12, 2012

(65) Prior Publication Data

US 2013/0051100 A1     Feb. 28, 2013

(30) Foreign Application Priority Data

Aug. 26, 2011     (JP) ................................ 2011-184433

(51) Int. Cl.
    *H02M 7/00*     (2006.01)
(52) U.S. Cl.
    USPC ............................................ 363/124; 363/65
(58) Field of Classification Search
    USPC ............... 363/65, 67, 68, 69, 89, 90, 97, 123, 363/124; 323/207
    See application file for complete search history.

(56) References Cited

U.S. PATENT DOCUMENTS

| | | | |
|---|---|---|---|
| 6,043,635 A * | 3/2000 | Downey | 323/282 |
| 6,473,280 B1 | 10/2002 | Buxton et al. | |
| 7,602,624 B2 * | 10/2009 | Nakashima | 363/65 |
| 8,248,041 B2 * | 8/2012 | Rausch et al. | 323/207 |
| 2010/0019702 A1 | 1/2010 | Jang et al. | |
| 2010/0176772 A1 | 7/2010 | Schaefert et al. | |
| 2011/0080143 A1 | 4/2011 | Parakulam et al. | |

FOREIGN PATENT DOCUMENTS

| | | |
|---|---|---|
| DE | 10 2007 025 229 A1 | 4/2008 |
| DE | 10 2009 027 307 A1 | 4/2010 |
| JP | 2002-44941 A | 2/2002 |

OTHER PUBLICATIONS

German Office Action, issued Jul. 23, 2013, Patent Application No. 10-2012 201325.3.

* cited by examiner

*Primary Examiner* — Nguyen Tran
(74) *Attorney, Agent, or Firm* — Sughrue Mion, PLLC

(57) ABSTRACT

A power supply device includes a failure determination means that detects, based on a current detected by a current detector, a failure of the switching elements of each of the chopper sections, and the failure determination means obtains values of the current detected by the current detector at the timing of falling edges of control signals to the switching elements of each of the chopper sections, determines the failure when the obtained current values differ from each other, and transmits a failure signal to a generation control means. When receiving the failure signal, the generation control means limits an output current from a generator in a way such that the withstanding current of a non-failed chopper section out of the chopper sections of the phases is not exceeded.

6 Claims, 9 Drawing Sheets

POWER SUPPLY DEVICE

BACKGROUND OF THE INVENTION

1. Field of the Invention

The present invention relates to a power supply device that converts an input voltage and outputs a stabilized voltage, and in particular to the one equipped with a multiphase chopper.

2. Description of the Related Art

A switched-mode DC-DC converter has been disclosed in Patent Document 1 as a power supply device of this kind, which includes a plurality of switching circuits, each for on/off-controlling an input current supplied from a common input power supply; a smoothing circuit for synthesizing and smoothing the on/off-controlled currents by each switching circuit, so as to supply the resultant current to an electrical load; and a multiphase PWM control circuit for on/off-operating the plurality of switching circuits with the same period but out of phase with each other and feedback-controlling the on-duration for each switching circuit, so that an output voltage from the smoothing circuit becomes a predetermined target value.

This power supply device takes on/off control of switching elements constituting the switching circuits described above, based on instructions from a microcomputer for controlling equipment states, and performs voltage conversion.

Patent Document 1: Japanese Laid-Open Patent Publication No. 2002-44941

The foregoing power supply device, by using the multiphase configuration, reduces amperage per phase as well as output ripples; however, if an open-circuit failure occurs in a switching element (for example, a MOSFET) of one phase, no current flows through the phase to which the switching element is connected; therefore, currents flowing through other remaining phases increase. If a current continues flowing through a switching element exceeding its allowable current, the element would be burnt out, in a worst-case scenario, leading to a fire. Moreover, even if not leading to a fire, if all of the phases fail, the power supply device sometimes cannot output power.

In a motor vehicle, etc., its battery is in some cases charged from a generator using the power supply device; therefore if the power supply device cannot output power, the battery cannot be charged, causing a problem in that the vehicle would eventually stop.

SUMMARY OF THE INVENTION

The present invention has been made to resolve the foregoing problem, and aims at providing a power supply device in which even if one or more than one chopper sections of a multiphase chopper constituting the DC-DC converter fail, the operation can be continued by remaining phase chopper sections.

A power supply device according to the present invention comprises: a power generation unit including a generator and a generation control means for controlling the generator when a DC voltage obtained by rectifying an AC voltage output from the generator exceeds a setting acceptable range; a multiphase chopper including chopper sections of a plurality of phases connected in parallel to the output side of the power generation unit, wherein each of the chopper sections of the phases includes a switching element driven in switched mode, a rectifying element connected to the output end of the switching element and a reactor for smoothing a voltage converted by the switching element and the rectifying element, and the switching element of each of the chopper sections of the phases is driven in switched mode, out of phase with each other, so as to convert the DC voltage from the power generation unit into a predetermined output voltage; a current detector for detecting an output current from the multiphase chopper; a smoothing capacitor for smoothing an output voltage from the multiphase chopper; a switching control means for computing from the output voltage and a setting target voltage a duty ratio for the switching element of each of the chopper sections of the phases, and outputting a control signal for on/off-controlling the switching element based on the computed duty ratio; and a failure determination means for detecting a failure of the switching element of each of the chopper sections of the phases, based on the current detected by the current detector; wherein the failure determination means obtains values of the current detected by the current detector at the timing of falling edges or rising edges of the control signal to the switching element of each of the chopper sections of the phases, determines a failure if the obtained current values differ from each other, generates a failure signal, and based on the failure signal, controls the current in a way such that the withstanding current of a non-failed chopper section out of the chopper sections of the phases is not exceeded.

According to the present invention, a failure of a switching element of each of the chopper sections of the phases constituting the multiphase chopper can be easily determined without fail, and the output current is controlled, based on the failure signal, in a way such that the withstanding current of a non-failed chopper section out of the chopper sections of the phases is not exceeded, whereby a power supply device can be provided in which even if an open-circuit failure occurs in a switching element of any one of the phases, the operation can be continued by remaining phases.

Moreover, according to the present invention, the failure can be detected by one current detector; therefore, a power supply device reduced in size can be provided.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1.

Figure 1:
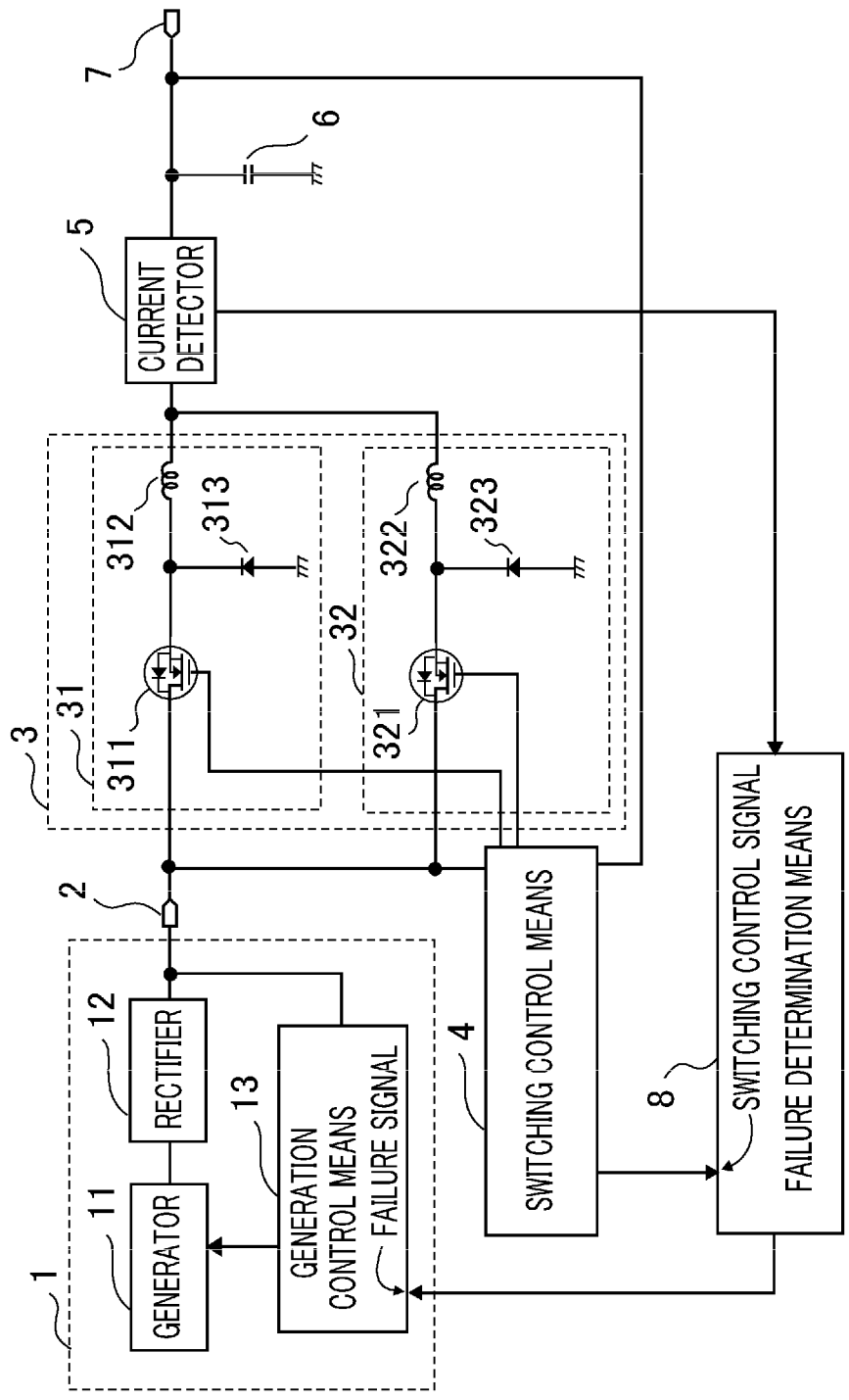
FIG. 1 is a block circuit diagram showing the configuration of a power supply device according to Embodiment 1 of the present invention.

FIG. 1 is a block diagram showing the configuration of a power supply device according to Embodiment 1 of the present invention.

In the figure, the power supply device comprises: a power generation unit 1 including a generator 11 and a generation control means 13 for controlling the generator 11 when a DC voltage obtained by rectifying by a rectifier 12 an AC voltage output from the generator 11 exceeds an acceptable range of a setting voltage; a multiphase chopper 3 including a first-phase chopper section 31 that is made up of a switching element 311 that is connected to an input terminal 2 connected to the power generation unit 1 and driven in switched mode, a rectifying element 313 whose anode and cathode are connected to ground and the output end of the switching element 311, respectively, and a reactor 312 that is connected to the output end of the switching element 311 and smoothes an input voltage converted by the switching element 311 and the rectifying element 313, and a second-phase copper section 32 that is configured the same as the first-phase chopper section 31 and made up of a switching element 321, a rectifying element 323 and a reactor 322; a current detector 5 that is provided in the output side of the multiphase chopper 3 and detects a reactor current; a smoothing capacitor 6 that is connected between the output side of the current detector 5 and ground and smoothes an output voltage from the multiphase chopper 3; a switching control means 4 that controls the switching element 311 and switching element 321; and a failure determination means 8 that determines, based on current values output from the current detector 5, a failed phase out of the multiphase chopper 3.

The switching control means 4 computes a duty ratio for the switching element 311 and switching element 321 using an input voltage input to the input terminal 2 and an output voltage output from an output terminal 7, and controls the switching element 311 and switching element 321.

Moreover, the switching control means 4 outputs a control signal to the switching element 321 as being shifted by 180° in phase with respect to a signal for controlling the switching element 311, so as to control the switching element 321. When the switching control means 4 turns on the switching element 311, a current flows through the reactor 312, whereas when the switching control means 4 turns off the switching element 311, a current flows from the rectifier element 313 toward the reactor 312 due to reverse electromotive force by the reactor 312, so that the output voltage is obtained at the output terminal 7 by the action of the smoothing capacitor 6.

The longer the on-duration for the switching element 311, the more the output voltage nears the input voltage; meanwhile, the shorter the on-duration for the switching element 311, the lower the output voltage becomes than the input voltage.

The timing of turning on/off the switching element 311 is determined by a switching frequency by which the switching element 311 is turned on and off and a duty ratio that is a ratio of the on-duration to the on- and off-durations for the switching element 311 (duty ratio=on-duration/period).

Hereinafter, the operation of the switching control means 4 for controlling the timing of turning on/off the switching element 311 will be explained.

Figure 2:
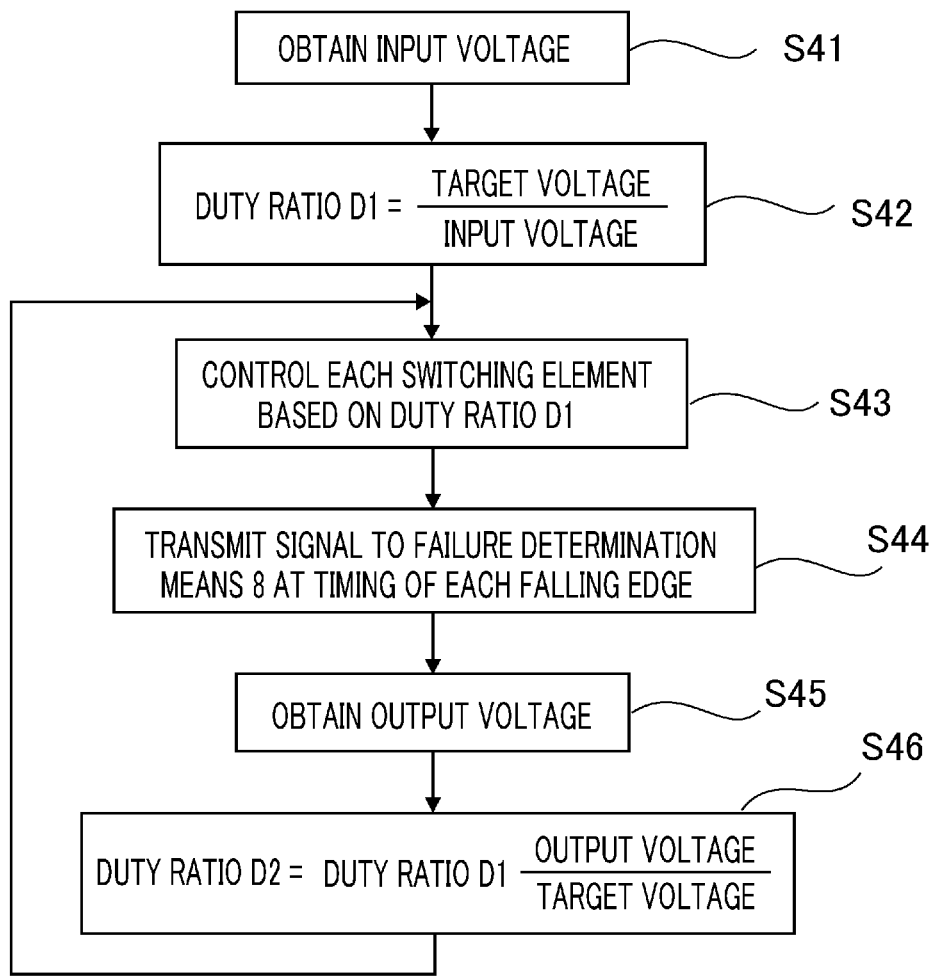
FIG. 2 is a flowchart showing the operation of a switching control means according to Embodiment 1 of the invention.

FIG. 2 is a flowchart showing the operation of the switching control means according to Embodiment 1. The switching control means 4, in order to compute a duty ratio of D1, obtains the input voltage input from the input terminal 2 as a non-stabilized voltage (a DC voltage output from the generation unit 1), immediately after powered on, and computes the duty ratio D1 (=target voltage/input voltage) using the obtained input voltage and a target voltage (setting target voltage, Steps S41 and S42). Here is shown the first-time (or early time) computation of the duty ratio D1 being performed using the input voltage and the target voltage; however the computation maybe performed giving a predetermined duty ratio.

Next, the switching control means 4 outputs the control signal using the duty ratio D1 computed in Step S42, and controls the switching element 311 (Step S43). And then, a signal is transmitted to the failure determination means 8 at the timing of the signal falling output from the switching control means 4 for controlling this switching element 311 (Step S44).

Lastly, the switching control means 4 computes, using the output voltage obtained from the output terminal 7 and the target voltage, a duty ratio of D2 as the preceding duty ratio D1×output voltage/target voltage, and updates the duty ratio (Steps S45 and S46). In addition, the switching control means 4 controls the switching element 321 in parallel with the switching element 311 in the same way as the switching element 311. At this moment, the switching control means 4 outputs the control signal for controlling the switching element 321 as being shifted by 180° in phase with respect to the signal for controlling the switching element 311.

A stabilized voltage can be supplied by repeating Step S43 to Step S46.

Next, an explanation will be made on a fundamental phenomenon for making determination of a failure in the foregoing power supply device.

Figure 3:
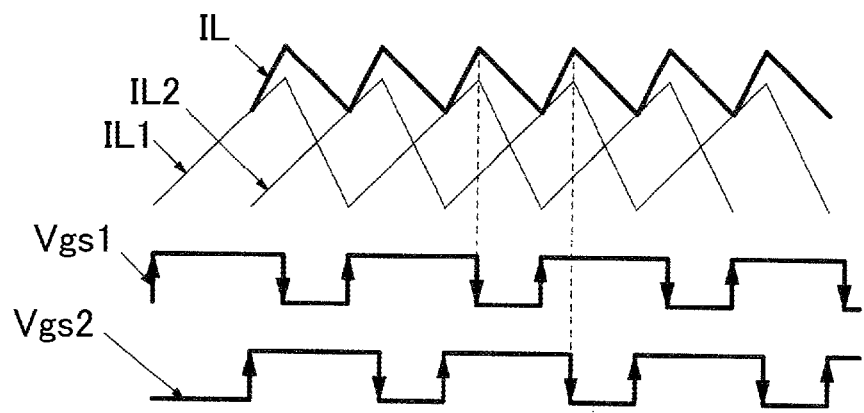
FIG. 3 is a diagram showing current with respect to time before a multiphase chopper according to Embodiment 1 fails.

Firstly, on/off timing of the switching element 311 and switching element 321 and their currents before and after a failure will be explained. Assume that an open-circuit failure occurs in the switching element 321. FIG. 3 shows current variations with respect to time before the failure occurs in the switching element 321. IL1 is an output current flowing through the reactor 312 from the first-phase chopper section 31; IL2 is an output current flowing through the reactor 322 from the second-phase chopper section 32; IL is the reactor current that is the sum of the output currents IL1 and IL2; Vgs1 is the control signal for on/off-controlling the switching element 311; and Vgs2 is the control signal for on/off-controlling the switching element 321.

The output currents IL1 and IL2 begin rising in accordance with the timing of the switching element 311 and switching element 321 being turned on, respectively. At this moment, the reactor current IL definitely peaks at the timing of falling edges of the control signals Vgs1 and Vgs2; therefore, current values detected at the timing of the falling edges of the control signals Vgs1 and Vgs2 coincide with each other.

Figure 4:
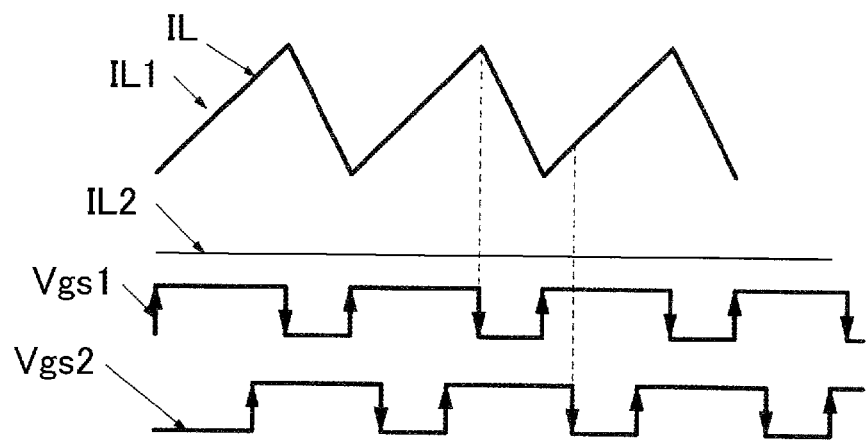
FIG. 4 is a diagram showing current with respect to time after a second-phase chopper section according to Embodiment 1 has failed.

FIG. 4 shows current variations with respect to time after the failure has occurred in the switching element 321. Since the reactor current IL is the sum of the output current IL1 and output current IL2, if the output current IL2 becomes zero due to the failure, the reactor current IL coincides with the output current IL1.

Moreover, if an electrical load connected to the output terminal 7 is the same, the same load current is required, and the average current of the reactor current IL is the same as before and after the failure; therefore, the value of the output current IL1 rises up. Then, the reactor current IL peaks at the timing of falling edges of the control signal Vgs1 but does not peak at the timing of falling edges of the control signal Vgs2 because of the phase difference between Vgs2 and Vgs1. Therefore, the current values detected at the timing of the falling edges of the control signal Vgs1 do not coincide with those detected at the timing of the falling edges of the control signal Vgs2.

Following the above, the operation of the failure determination means 8 will be explained hereinafter.

Figure 5:
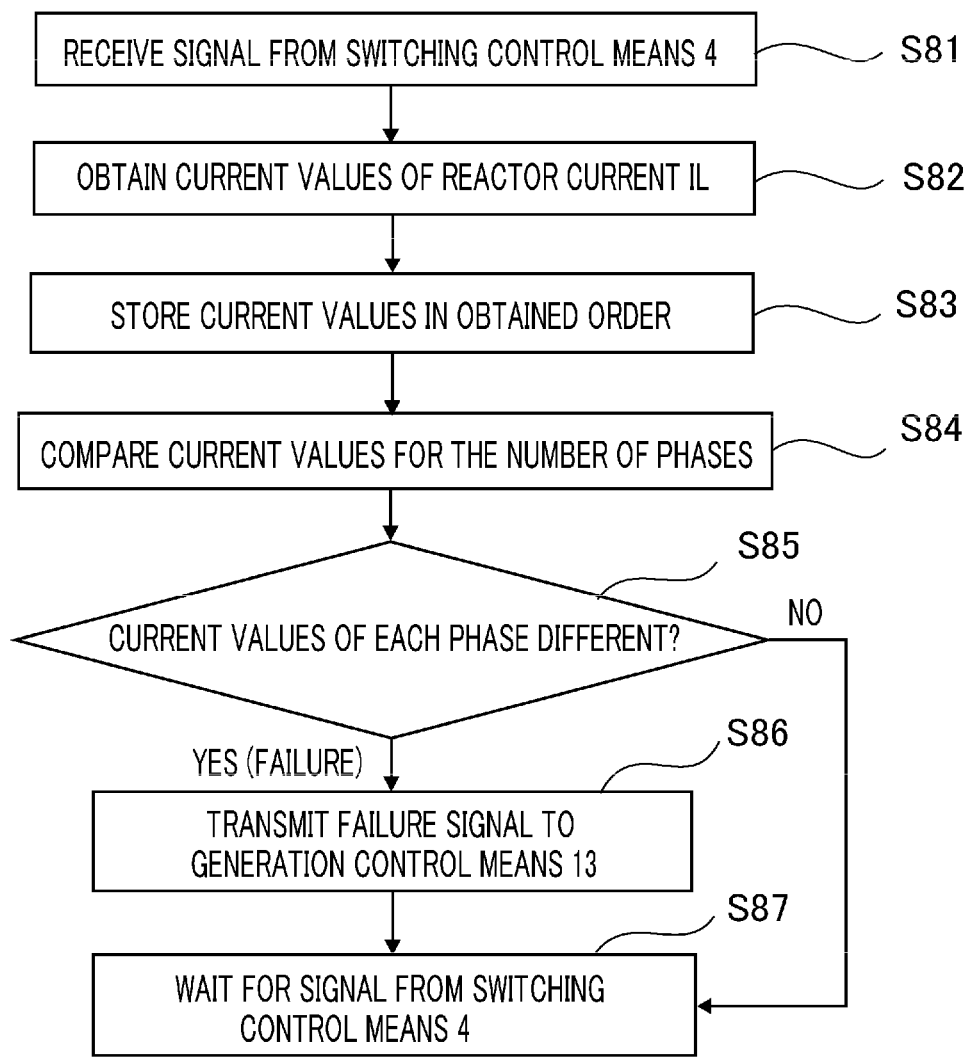
FIG. 5 is a flowchart showing the operation of a failure determination means according to Embodiment 1 of the invention.

FIG. 5 is a flowchart showing the operation of the failure determination means 8 of the power supply device according to Embodiment 1 of the invention. The failure determination means 8 receives a falling-edge signal of the control signal Vgs1 or Vgs2 the switching control means 4 transmits (Step S81). The failure determination means 8 obtains at this timing an output (values of the reactor current IL) from the current detector 5 (Step S82). Current values for more than the number of phases are stored in their obtained order (Step S83). Current values for the number of phases among the stored current values are compared with each other (Step S84). If no failure occurs here, all of the stored current values become the same current value, as the result of comparing the values with each other.

The failure determination means 8 determines that no failure occurs in this case, and stands by to receive again a falling-edge signal of the control signal Vgs1 or Vgs2 the switching control means 4 transmits.

If a failure occurs, the result of the comparison of the current values indicates that at least one of the stored current values is different from the others. The failure determination means 8 determines that a failure has occurred in this case, and transmits to the generation control means 13 a failure signal informing of occurrence of this failure.

After transmitting the failure signal, the failure determination means 8 stands by to receive again a falling-edge signal of the control signal Vgs1 or Vgs2 the switching control means 4 transmits (Step S85, Step S86 and Step S87).

Furthermore, a method of limiting current in the power generation unit 1 will be explained.

When receiving the failure signal, the power generation unit 1 limits the amperage through the switching element 311 below its allowable current.

Figure 6:
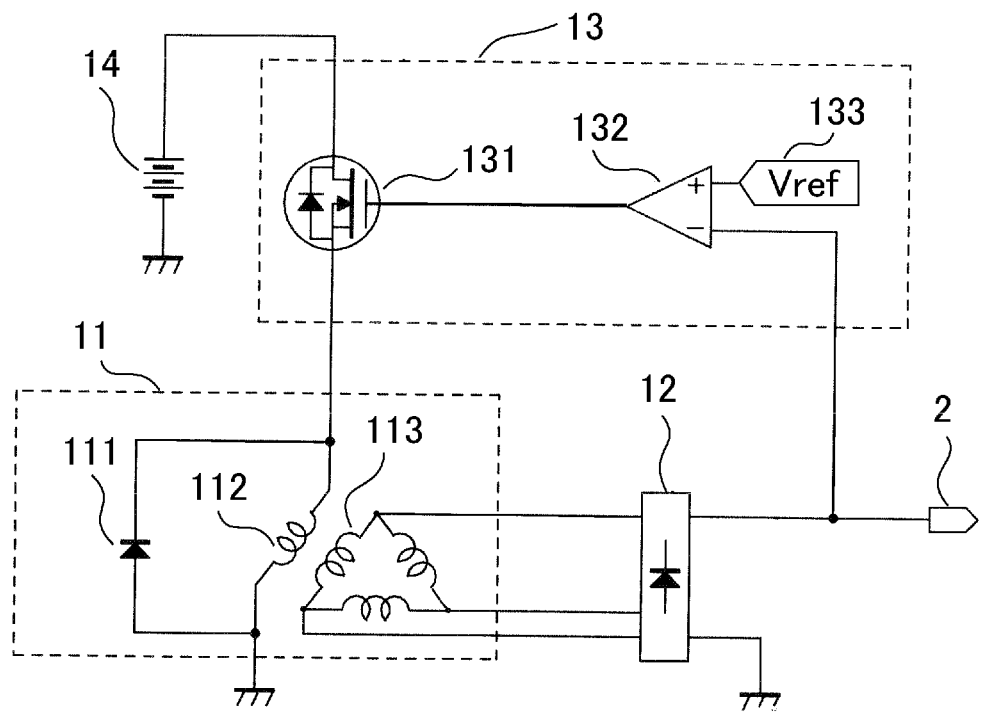
FIG. 6 is a circuit diagram showing a specific example of a power generation unit according to Embodiment 1 of the invention.

Firstly, the operation of the power generation unit 1 will be explained. FIG. 6 is a diagram showing a specific example of the power generation unit 1 of the power supply device according to Embodiment 1 of the invention. The power generation unit 1 represents an alternator as a specific example. In the figure, the generator 11 includes a reverse-current-prevention diode 111, a field coil 112 and a three-phase generator 113; an output voltage to the input terminal 2 is controlled by a field current flowing through the field coil 112.

In the generation control means 13, a DC voltage output from the rectifier 12 that rectifies an AC voltage output from the generator 11 is input to the inverting input terminal of a comparator 132, and a setting voltage 133 is input to the non-inverting input terminal of the comparator. When the voltage at the non-inverting input terminal is higher than that at the inverting input terminal, the comparator 132 produces output, but when the voltage at the non-inverting input terminal is lower than that at the inverting input terminal, it doesn't. Therefore, when the output voltage from the power generation unit 1 becomes lower than the setting voltage 133, the comparator 132 produces output, a MOSFET 131 is thereby made conductive, and the current flows from a battery 14 to the field coil 112, so that the output voltage is controlled to become exactly the same as the setting voltage 133.

Next, a maximum output current and output voltage from the power generation unit 1 will be explained.

Figure 7:
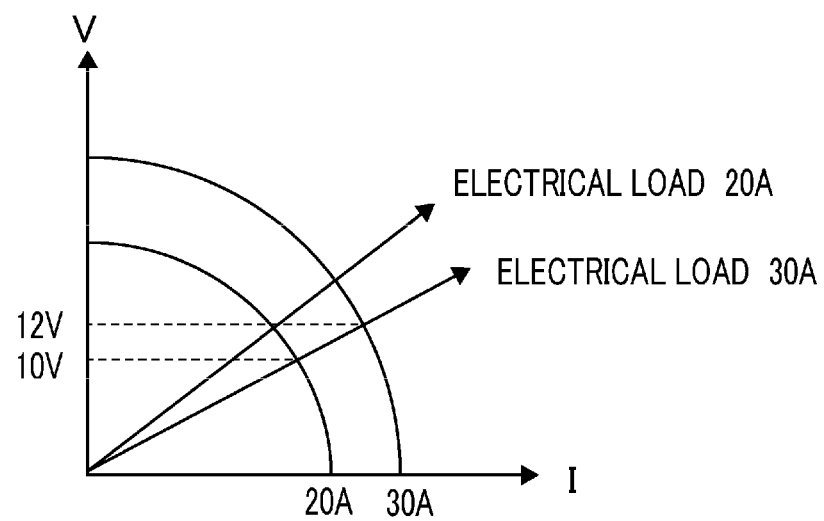
FIG. 7 is a diagram showing an example of setting an output voltage with respect to a maximum output current from the power generation unit according to Embodiment 1 of the invention.

FIG. 7 is a diagram showing an example of setting the output voltage with respect to the maximum output current from the power generation unit 1 according to Embodiment 1 of the invention; the horizontal axis represents the maximum output current and the vertical axis represents the output voltage.

For example, when the electrical load is 20 A and the power generation unit is outputting a setting voltage 133 of 12 V, if the load is varied from 20 A to 30 A, the output voltage becomes 10 V on the line of a maximum output current 20 A. At this moment, by letting the field current flow through the field coil 112, the output voltage is raised to become the setting voltage 133.

The generation control means 13 when receiving a failure signal due to a failure of the switching element 321 will be explained.

Given that before the failure, the output voltage from the power generation unit 1 is 12 V, the load is 30 A, and the allowable current of the switching element 311 and switching element 321 is 20 A, a current per switching element is 15 A before the failure even if the load is 30 A, which does not cause any problem. However after the failure has occurred, the current flowing through the switching element 311 becomes 30 A, exceeding the allowable current of the switching element 311, 20 A; therefore, the setting voltage 133 for the generation control means 13 is changed to 10 V, whereby the output current from the power generation unit 1 can be suppressed below 20 A.

Furthermore, when an alternator is employed, the output current can be controlled by controlling the setting voltage as described above; however when a rotation generator is employed, a method of limiting the number of rotations may also be used to limit the current.

As described above, the power supply device according to Embodiment 1 comprises: a power generation unit 1 including a generator 11 and a generation control means 13 for controlling the generator 11 when a DC voltage obtained by rectifying an AC voltage output from the generator 11 exceeds a setting acceptable range; a multiphase chopper 3 including the chopper sections of a plurality of phases 31 and 32 connected in parallel to the output side of the power generation unit 1, wherein the chopper sections of the phases 31 and 32 include switching elements 311 and 321 driven in switched mode, rectifying elements 313 and 323 connected to the output end of the switching elements 311 and 321 and reactors 312 and 322 for smoothing a voltage converted by the switching elements 311 and 321 and the rectifying elements 313 and 323, respectively, and the switching elements 311 and 321 of the chopper sections of the phases 31 and 32 are driven in switched mode, out of phase with each other, so as to convert the DC voltage from the power generation unit 1 into a predetermined output voltage; a current detector 5 for detecting an output current from the multiphase chopper 3; a smoothing capacitor 6 for smoothing an output voltage from the multiphase chopper 3; a switching control means 4 for computing from the output voltage and a setting target voltage a duty ratio for the switching elements 311 and 321 of the respective chopper sections of the phases 31 and 32, and outputting control signals each for on/off-controlling the switching elements 311 and 321 based on the computed duty ratio; and a failure determination means 8 for detecting a failure in the switching elements 311 and 321 of the respective chopper sections of the phases 31 and 32, based on the current detected by the current detector 5; wherein the failure determination means 8 obtains values of the current detected by the current detector 5 at the timing of falling edges or rising edges of the control signals to the switching elements 311 and 321 of the respective chopper sections of the phases 31 and 32, determines a failure if the obtained current values differ from each other, transmits a failure signal to the generation control means 13, and when receiving the failure signal, the generation control means 13 limits the output current from the generator 11 in away such that the withstanding current of a non-failed chopper section out of the chopper sections of the phases 31 and 32 is not exceeded.

By configuring as described above, a power supply device can be provided in which the current values detected at the timing of falling edges of the control signals each for on/off-controlling the switching elements 311 and 321 are compared with each other, and if a current value differing from the other is obtained, the failure determination means determines a failure, the output current from the power generation unit 1 is decreased so that the current through the switching element 311 or 321 becomes lower than the allowable current, and as a result, all of the switching elements can be prevented from failing and a charging-completely-disabled state can be avoided even if an open-circuit failure occurs in either the switching element 311 or 321.

Moreover, since the output current from the multiphase chopper 3 definitely peaks at falling edges of the non-failed phase, an effect can be also brought about in which a phase demonstrating a current lower than the other can be determined to have failed, from the comparison result of the current values obtained by the failure determination means 8.

Embodiment 2.

Figure 8:
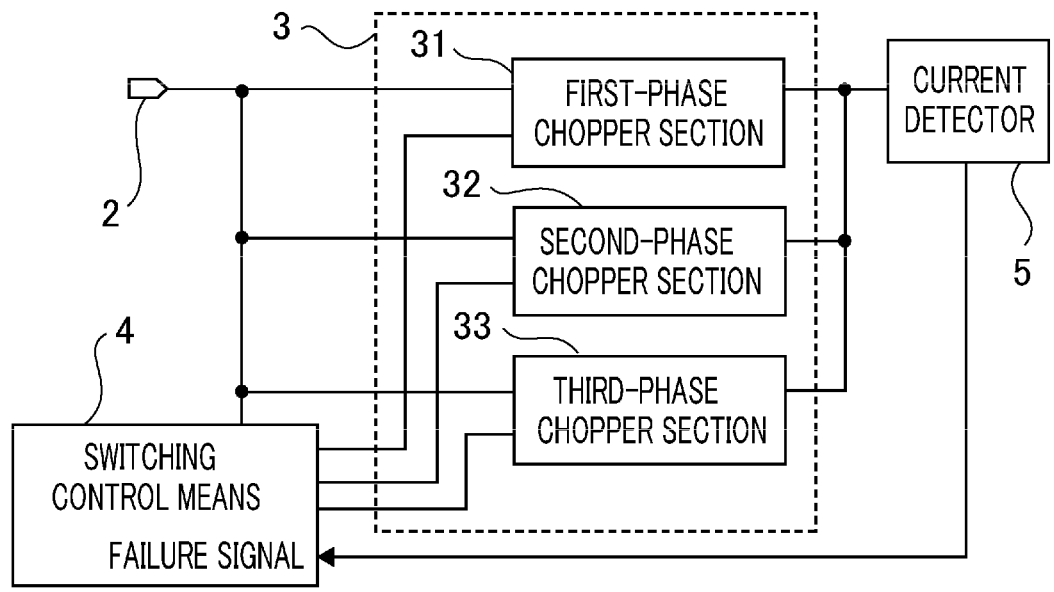
FIG. 8 is a block diagram showing the configuration of a multiphase chopper of a power supply device according to Embodiment 2 of the invention.

FIG. 8 is a block diagram showing an example of a multiphase chopper of a power supply device according to Embodiment 2 of the present invention being constituted of three-phase chopper sections, which in addition to the first chopper section 31 and second chopper section 32 of Embodiment 1, includes a third chopper section 33 configured the same as these chopper sections. In this configuration, the switching control means 4 outputs control signals that are shifted by 120° in phase with each other to the switching elements 311, 321 and 331 (not shown in the figure) of the respective phase chopper sections 31, 32 and 33.

The control signals to the switching elements of the chopper sections 31, 32 and 33 and their currents before and after a failure will be explained. Assume that an open-circuit failure occurs in the switching element 321 of the second-phase chopper section 32.

Figure 9:
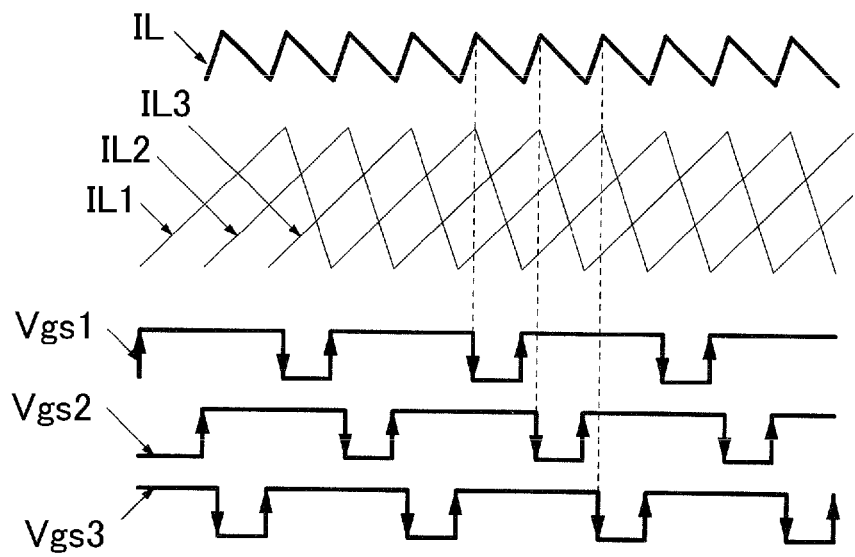
FIG. 9 is a diagram showing current with respect to time before the multiphase chopper according to Embodiment 2 fails.

FIG. 9 shows currents with respect to time before the switching element 321 fails. IL represents a reactor current that is the sum of an output current IL1 from the first-phase chopper section 31, an output current IL2 from the second-phase chopper section 32 and an output current IL3 from the third-phase chopper section 33 that flow into the current detector 5; Vgs1, Vgs2 and Vgs3 are control signals for driving the first-phase chopper section 31, the second-phase chopper section 32 and the third-phase chopper section 33, respectively.

In the three-phase multiphase chopper 3, the reactor current IL peaks at the timing of falling edges of the control signals Vgs1, Vgs2 and Vgs3 as well; therefore, the current values detected at the timing of falling edges of these control signals Vgs1, Vgs2 and Vgs3 coincide with each other.

Figure 10:
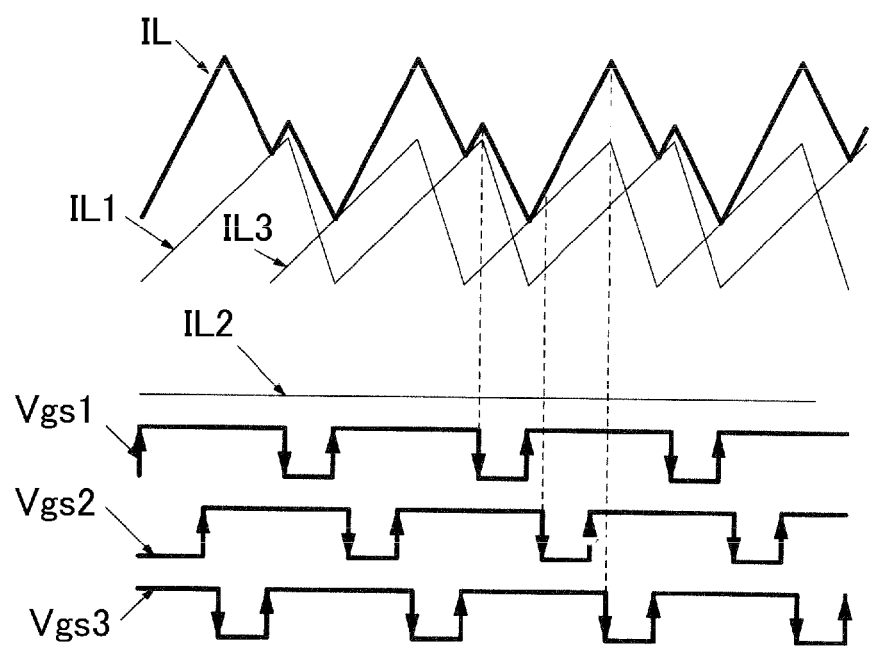
FIG. 10 is a diagram showing current with respect to time after a second-phase chopper section according to Embodiment 2 has failed.

FIG. 10 shows those currents with respect to time after the switching element 321 of the second-phase chopper section 32 has failed.

Since the reactor current IL is the sum of the output currents IL1, IL2 and IL3, if the output current IL2 becomes zero due to the failure, the reactor current IL becomes the sum of the output current IL1 and output current IL3. Since the control signals are out of phase with each other, the current values detected at the timing of falling edges of the control signals Vgs1, Vgs2 and Vgs3 do not coincide with each other.

Since the failure determination means 8 transmits a failure signal when current values obtained at the timing of falling edges of each control signal differ from each other, the means can take the same control as that in Embodiment 1. Moreover, the current limiting level of the power generation unit 1 is set to the allowable current of the switching element 311, the same as Embodiment 1.

According to Embodiment 2 as described above, even when the multiphase chopper 3 includes three phases, the current values detected at the timing of the falling edges of the control signals for the switching elements constituting each of the chopper sections of the phases 31, 32 and 33 are compared with each other. When a current value differing from the others is obtained, the failure determination means determines a failure, the output current from the power generation unit 1 is decreased below the allowable current of the other switching elements, whereby a power supply device can be provided that can prevent all of the switching elements from failing and avoid a charging-completely-disabled state, even if an open-circuit failure occurs in any switching element.

Embodiment 3.

Figure 11:
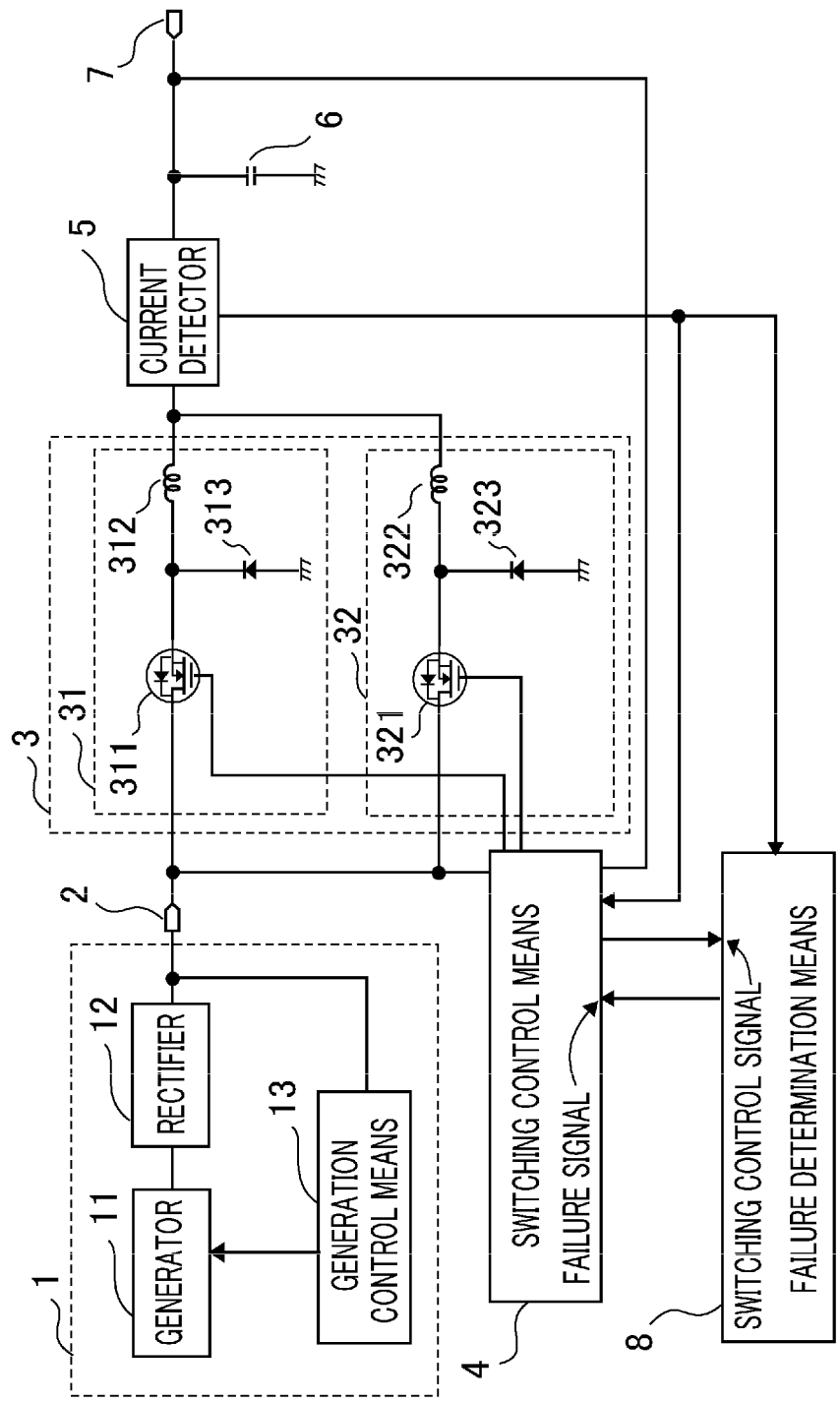
FIG. 11 is a block circuit diagram showing the configuration of a power supply device according to Embodiment 3 of the invention.

FIG. 11 is a block diagram showing the configuration of a power supply device according to Embodiment 3 of the present invention.

The power supply device is configured in a way such that the failure determination means 8 transmits a failure signal to the switching control means 4, and the switching control means 4, when receiving the failure signal, obtains values of the reactor current IL detected by the current detector 5 and adjusts a duty ratio for switching elements of non-failed chopper sections of the phases so that their withstanding current is not exceeded.

Figure 12:
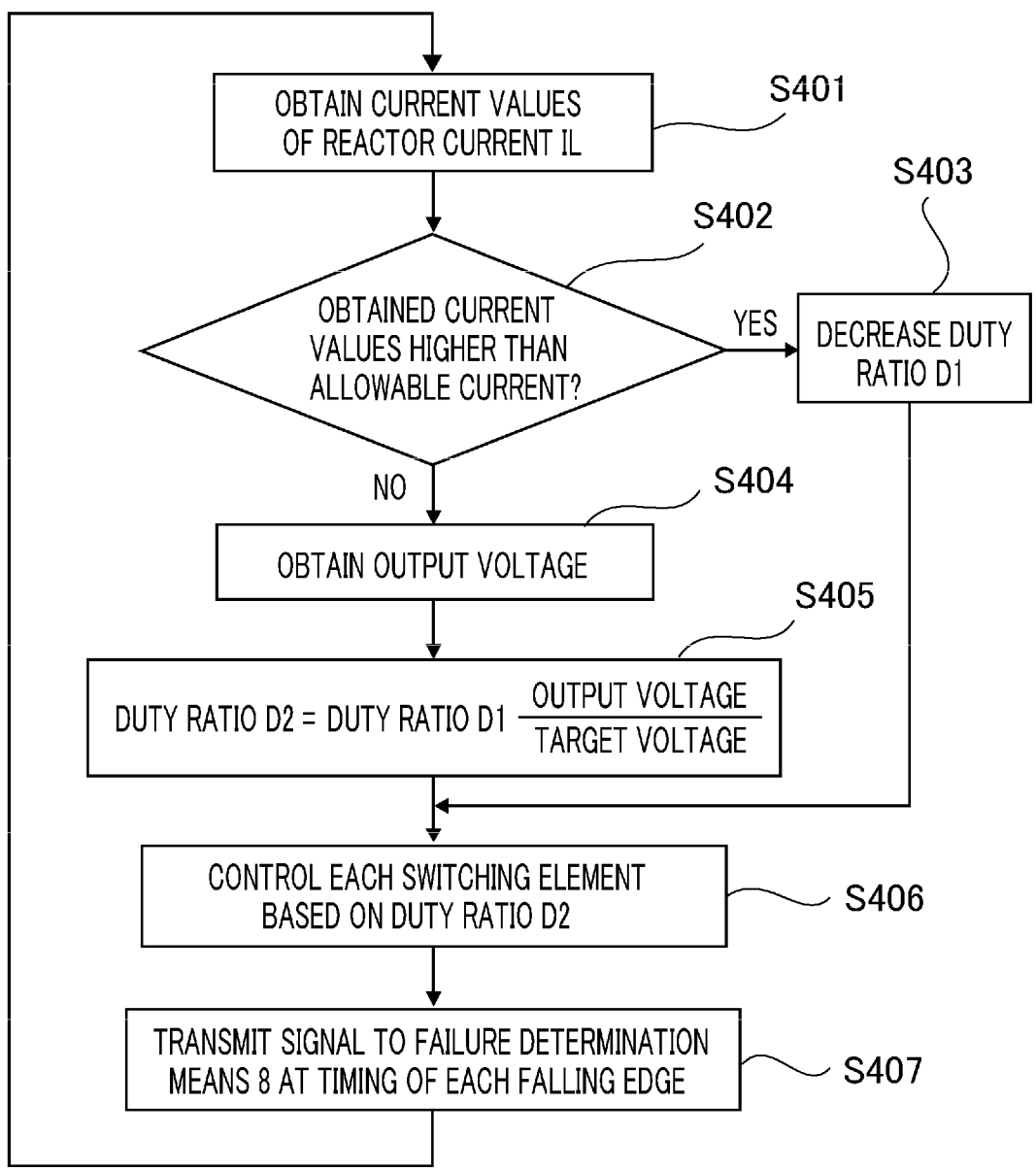
FIG. 12 is a flowchart showing the operation of a switching control means according to Embodiment 3 of the invention.

FIG. 12 is a flowchart showing the operation of the switching control means according to Embodiment 3 of the invention. Before a switching element fails, Steps S81 to S87 shown in FIG. 5 are executed the same as Embodiment 1. Here, when a switching element fails, the failure determination means 8 transmits a failure signal to the switching control means 4 after the completion of Step S85 in FIG. 5. After receiving the failure signal, the switching control means 4 obtains from the current detector 5 the values of the reactor current IL (Step S401).

Next, the obtained current values and the allowable current of the switching element 311 are compared with each other (Step S402). At this moment, when the allowable current of the switching element 311<the obtained current values, the switching control means, in order to limit the obtained current values, decreases the duty ratio D1 so as to suppress the current increase (Step S403). When the allowable current of the switching element 311>the obtained current values, the switching control means computes the duty ratio D2 as usual (Step S404 and Step S405). The switching control means controls each switching element using the computed duty ratio D2, and transmits a falling-edge signal (Step S406 and Step S407).

The current can be limited by repeating Steps S401 to S407.

According to Embodiment 3 as described above, the failure determination means 8 determines a failure, and when a switching element fails, the means controls to limit the duty ratio for other switching elements so that the current values to be obtained from the current detector 5 do not exceed the allowable current of the switching elements, whereby a power supply device can be provided that can prevent all of the switching elements from failing and avoid a charging-completely-disabled state, even if an open-circuit failure occurs in any switching element.

By the way, falling edges of the control signals Vgs1, Vgs2 and Vgs3 are utilized in each of the foregoing embodiments; however since the reactor current IL takes a minimum value at all rising edges before the failure, all of the current values of the reactor current IL the failure determination means 8 obtains become the same; meanwhile if a switching element fails, since the control signals are out of phase with each other, the same as the falling edges, the current values the failure determination means 8 obtains become different from each other. Therefore, control can also be taken at the rising edges of the control signals Vgs1, Vgs2 and Vgs3.

Moreover in the foregoing embodiments, currents are limited so as only to prevent the switching element of the respective chopper sections from failing; however, control may be taken for enhancing responsiveness and the like, when a switching element fails.

In PI control, for example, the responsiveness can be adjusted by setting I-gains and P-gains of current and voltage separately for when a switching element fails and for when it does not fail. Although the PI control is a publicly known technology, that will be explained hereinafter.

In a power supply device, using a target current computed as [target voltage (setting voltage)−output voltage]×(PV+IV), a duty ratio is computed as (target current−output current)×(PI+II), where PV: voltage P-gain; IV: voltage I-gain; PI: current P-gain; and II: current I-gain.

For example, assume that the target voltage is 10 V; the output voltage is 0 V; the target current is 10 A; the output current is 0 A; PI is 0.1 and II is 0. A first-time duty ratio can be calculated 50% in this case, regardless of one phase or two phases. The amount of current increase Ir can be calculated by Equation 1 using an input voltage of Vin, an output voltage of Vout, a reactor inductance of L, a duty ratio of D and a switching frequency of fsw. Therefore, the amount of first-time current increase is the same regardless of one phase or two phases. In the case of two phases, the control signals are shifted by 180° in phase with each other; therefore when a first phase is turned off, a second phase is turned on.

In the case of one phase, a current increases during 50% of one period and decreases during the remaining 50% of the period, whereas in the case of two phases, while a current in the first phase is decreasing during 50% of the period, a current in the second phase increases. Therefore, if the PI gains are the same in the one-phase and two-phase cases in the foregoing example, current supply capacity in the one-phase case is lower than that in the two-phase case; therefore charging up of equipment connected to the power supply device becomes slower, so that its responsiveness will be slowed. The responsiveness can be enhanced by adjusting the gain.

Furthermore, the failure mode of the switching elements of each of chopper sections of the phases is an open-circuit failure in the foregoing embodiments; however if a circuit breaker such as a fuse is interposed and connected between the input terminal 2 that is the output side of the power generation unit 1 and each switching element, even if a short-circuit failure occurs, the phase corresponding to the short-circuit failure is disconnected by an overcurrent therethrough, so that the phase can be brought into the same mode as the open-circuit failure. Therefore, this invention can be applied to the short-circuit failure mode as well.

Moreover, the switching control means 4 can be realized by combining a microcomputer and gate drive ICs together in the foregoing embodiments, and the current detector 5 can also be realized by combining shunt resisters and amplifiers or using hall-effect current detection ICs or the like. Moreover, MOSFETs are exemplified as the switching elements; however switching elements such as IGBTs can also take such control; therefore, the switching elements are not necessarily limited to MOSFETs.

Furthermore, diodes are exemplified as the rectifying elements 313 and 323, for example; however, switching elements such as MOSFETs and IGBTs can rectify currents; therefore the rectifying elements are not necessarily limited to diodes.

Various modifications and alterations of this invention will be apparent to those skilled in the art without departing from the scope and spirit of this invention, and it should be understood that this is not limited to the illustrative embodiments set forth herein.

What is claimed is:

1. A power supply device, comprising:
a power generation unit including a generator and a generation control means for controlling the generator when a DC voltage obtained by rectifying an AC voltage output from the generator exceeds a setting acceptable range;
a multiphase chopper including chopper sections of a plurality of phases connected in parallel to an output side of the power generation unit, wherein each of the chopper sections of the phases includes a switching element driven in switched mode, a rectifying element connected to an output end of the switching element and a reactor for smoothing a voltage converted by the switching element and the rectifying element, and the switching element of each of the chopper sections of the phases is driven in switched mode, out of phase with each other, so as to convert the DC voltage from the power generation unit into a predetermined output voltage;
a current detector for detecting an output current from the multiphase chopper;
a smoothing capacitor for smoothing an output voltage from the multiphase chopper;
a switching control means for computing from the output voltage and a setting target voltage a duty ratio for the switching element of each of the chopper sections of the phases, and outputting a control signal for on/off-controlling the switching element based on the computed duty ratio; and
a failure determination means for detecting a failure of the switching element of each of the chopper sections of the phases, based on the current detected by the current detector; wherein
the failure determination means obtains values of the current detected by the current detector at timing of falling edges or rising edges of the control signal to the switching element of each of the chopper sections of the phases, determines the failure if the obtained current values differ from each other, generates a failure signal, and based on the failure signal, controls the current in a way such that a withstanding current of a non-failed chopper section out of the chopper sections of the phases is not exceeded.

2. A power supply device according to claim 1, wherein the failure determination means transmits the failure signal to the generation control means, and when receiving the failure signal, the generation control means limits an output current from the generator in a way such that the withstanding current of the non-failed chopper section out of the chopper sections of the phases is not exceeded.

3. A power supply device according to claim 1, wherein the multiphase chopper includes the chopper sections of at least three phases.

4. A power supply device according to claim 1, wherein the failure determination means transmits the failure signal to the switching control means, and the switching control means adjusts the duty ratio for the switching element in a way such that the withstanding current of the non-failed chopper section out of the chopper sections of the phases is not exceeded.

5. A power supply device according to claim 1, wherein when the failure determination means determines the failure, a control parameter for the switching element of each of the chopper sections of the phases is varied so as to vary responsiveness.

6. A power supply device according to claim 1, wherein a circuit breaker is connected between the output side of the power generation unit and the switching element of each of the chopper sections of the phases, and when a short-circuit failure occurs in the switching element, the circuit breaker is blown off so as to bring the switching element into the same failure mode as an open-circuit failure.

* * * * *